(12) United States Patent
Lidian et al.

(10) Patent No.: US 9,736,770 B2
(45) Date of Patent: Aug. 15, 2017

(54) CONTROLLER NODE AND A METHOD THEREIN FOR SELECTING A NETWORK NODE IN A HETEROGENEOUS NETWORK

(71) Applicant: Telefonaktiebolaget LM Ericsson (publ), Stockholm (SE)

(72) Inventors: Namir Lidian, Solna (SE); Sairamesh Nammi, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/024,077

(22) PCT Filed: Mar. 21, 2014

(86) PCT No.: PCT/SE2014/050350
§ 371 (c)(1),
(2) Date: Mar. 23, 2016

(87) PCT Pub. No.: WO2015/047151
PCT Pub. Date: Apr. 2, 2015

(65) Prior Publication Data
US 2016/0234769 A1    Aug. 11, 2016

Related U.S. Application Data

(60) Provisional application No. 61/882,345, filed on Sep. 25, 2013.

(51) Int. Cl.
*H04W 4/00* (2009.01)
*H04W 48/20* (2009.01)
(Continued)

(52) U.S. Cl.
CPC ........... *H04W 48/20* (2013.01); *H04L 5/0048* (2013.01); *H04L 5/0057* (2013.01); *H04B 7/0842* (2013.01); *H04W 84/045* (2013.01)

(58) Field of Classification Search
CPC ...... H04B 7/0842; H04B 1/707; H04B 17/24; H04W 84/045; H04W 48/20;
(Continued)

(56) References Cited

U.S. PATENT DOCUMENTS 7,089,015 B2 *  8/2006  Fukui ................... H04L 1/0026
                                                   455/450
8,238,932 B2 *  8/2012  De Pasquale ........ H04B 7/0413
                                                   455/436
(Continued)

FOREIGN PATENT DOCUMENTS

WO    2014137265 A1    9/2014
WO    2014163570 A1    10/2014
WO    2014189420 A1    11/2014

OTHER PUBLICATIONS

Author Unknown, "Technical Specification Group Radio Access Network; Introduction of the Multimedia Broadcast/Multicast Service (MBMS) in the Radio Access Network (RAN); Stage 2 (Release 11)," Technical Specification 25.346, Version 11.0.0, 3GPP Organizational Partners, Sep. 2012, 71 pages.

(Continued)

*Primary Examiner* — Mahendra Patel
(74) *Attorney, Agent, or Firm* — Patent Portfolio Builders, PLLC (57) ABSTRACT

The exemplary embodiments herein relate to a controller node and a method in a controller node for selecting a network node in an heterogeneous network comprising a plurality of network nodes. The method comprises, receiving CQI values from a UE and based on those values selecting a network node for serving a UE.

8 Claims, 11 Drawing Sheets

(51) Int. Cl.
 *H04L 5/00* (2006.01)
 *H04B 7/08* (2006.01)
 *H04W 84/04* (2009.01)

(58) Field of Classification Search
 CPC ... H04W 52/40; H04W 28/06; H04W 52/146; H04L 5/0057; H04L 5/0048; H04L 1/1812; H04L 5/00; H04L 1/0003; H04L 1/0028; H04L 1/20
 USPC ........ 455/432.2, 435.2; 370/216, 395.2, 230, 370/352, 522
 See application file for complete search history.

(56) References Cited

U.S. PATENT DOCUMENTS

| | | | | |
|---|---|---|---|---|
| 8,271,013 | B2* | 9/2012 | Sagfors | H04L 1/0015 455/13.4 |
| 2003/0123396 | A1* | 7/2003 | Seo | H04W 52/286 370/252 |
| 2003/0157900 | A1* | 8/2003 | Gaal | H04B 17/309 455/69 |
| 2003/0185159 | A1* | 10/2003 | Seo | H04L 1/0026 370/278 |
| 2003/0185242 | A1* | 10/2003 | Lee | H04L 1/0026 370/491 |
| 2008/0101312 | A1* | 5/2008 | Suzuki | H04L 1/0007 370/342 |
| 2010/0135169 | A1* | 6/2010 | Hu | H04L 1/0028 370/252 |
| 2010/0165934 | A1* | 7/2010 | Tayloe | H04L 1/0015 370/329 |
| 2012/0008511 | A1* | 1/2012 | Fan | H04B 1/7107 370/252 |
| 2012/0093010 | A1* | 4/2012 | Vajapeyam | H04W 52/244 370/252 |
| 2012/0122472 | A1* | 5/2012 | Krishnamurthy | H04L 5/0053 455/456.1 |
| 2012/0163207 | A1* | 6/2012 | Dua | H04L 1/0015 370/252 |
| 2013/0114450 | A1* | 5/2013 | Xu | H04W 72/0426 370/252 |
| 2015/0195073 | A1* | 7/2015 | Nammi | H04W 28/16 455/452.2 |

OTHER PUBLICATIONS

Ericsson, et al., "R1-124512: Initial considerations on Heterogeneous Networks for UMTS," 3rd Generation Partnership Project (3GPP), TSG RAN WG1 Meeting #70bis, Oct. 8-12, 2012, 7 pages, San Diego, California.

Ericsson, et al., "R1-124513: Heterogeneous Network Deployment Scenarios," 3rd Generation Partnership Project (3GPP), TSG-RAN WG1 #70bis, Oct. 8-12, 2012, 3 pages, San Diego, California.

Ericsson, et al., "R1-130610: Overview of Combined Cell Deployment in Heterogeneous Networks," 3rd Generation Partnership Project (3GPP), TSG RAN WG1 Meeting #72, Jan. 28,-Feb. 1, 2013, 12 pages, St Julian's, Malta.

Ericsson, et al., "R1-132603: Overview of Spatial Reuse Mode in Combined Cell Deployment for Heterogeneous Networks," 3rd Generation Partnership Project (3GPP), TSG RAN WG1 Meeting #73, May 20-24, 2013, 7 pages, Fukuoka, Japan.

Huawei, et al., "RP-121436: Proposed SID: Study on UMTS Heterogeneous Networks," 3rd Generation Partnership Project (3GPP), TSG RAN Meeting #57, Sep. 4-7, 2012, 5 pages, Chicago, Illinois.

International Search Report and Written Opinion for International Patent Application No. PCT/SE2014/050350, mailed Dec. 16, 2014, 14 pages.

* cited by examiner

CONTROLLER NODE AND A METHOD THEREIN FOR SELECTING A NETWORK NODE IN A HETEROGENEOUS NETWORK

This application is a 35 U.S.C. §371 national phase filing of International Application No. PCT/SE2014/050350, filed Mar. 21, 2014, which claim priority to U.S. Provisional Application No. 61/882,345, filed Sep. 25, 2013, the disclosures of which are incorporated herein by reference in their entireties.

TECHNICAL FIELD

Embodiments herein relate to a network or controller node and a method therein. In particular, embodiments herein relate to a controller node for selecting a network node for serving a user equipment in a combined cell scenario of a heterogeneous network.

BACKGROUND

In a typical radio communications network, wireless terminals, also known as mobile stations and/or user equipments (UEs), communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

During the last few years cellular operators have started to offer mobile broadband based on WCDMA/HSPA. Further, fuelled by new devices designed for data applications, the end user performance requirements are steadily increasing. The large uptake of mobile broadband has resulted in heavy traffic volumes that need to be handled by the HSPA networks have grown significantly. Therefore, techniques that allow cellular operators to manage their spectrum resources more efficiency are of large importance.

Few such techniques whereby it is possible to improve the downlink performance would be to introduce support for 4-branch Multiple Input Multiple Output (MIMO), multi-flow communication, multi carrier deployment etc. Since improvements in spectral efficiency per link are approaching theoretical limits, the next generation technology is about improving the spectral efficiency per unit area. In other words, the additional features for High Speed Downlink Packet Access (HSDPA) need to provide a uniform user experience to users anywhere inside a cell by changing the topology of traditional networks. Currently 3GPP has been working on this aspect using Heterogeneous networks (HetNet) [1]-[3].

A homogeneous network is a network of base stations or network nodes (Node B) in a planned layout and a collection of user terminals e.g. UEs in which network all base stations have similar transmit power levels, antenna patterns, receiver noise floors, and similar backhaul connectivity to the data network. Note that the data network can be either core network either via RNC or directly to the core network. Moreover, all base stations offer unrestricted access to user terminals in the network, and serve roughly the same number of user terminals or UEs. Current wireless systems that belong to this category are for example as mentioned above, GSM, WCDMA, HASDPA, LTE, Wimax. Etc.

Figure 1:
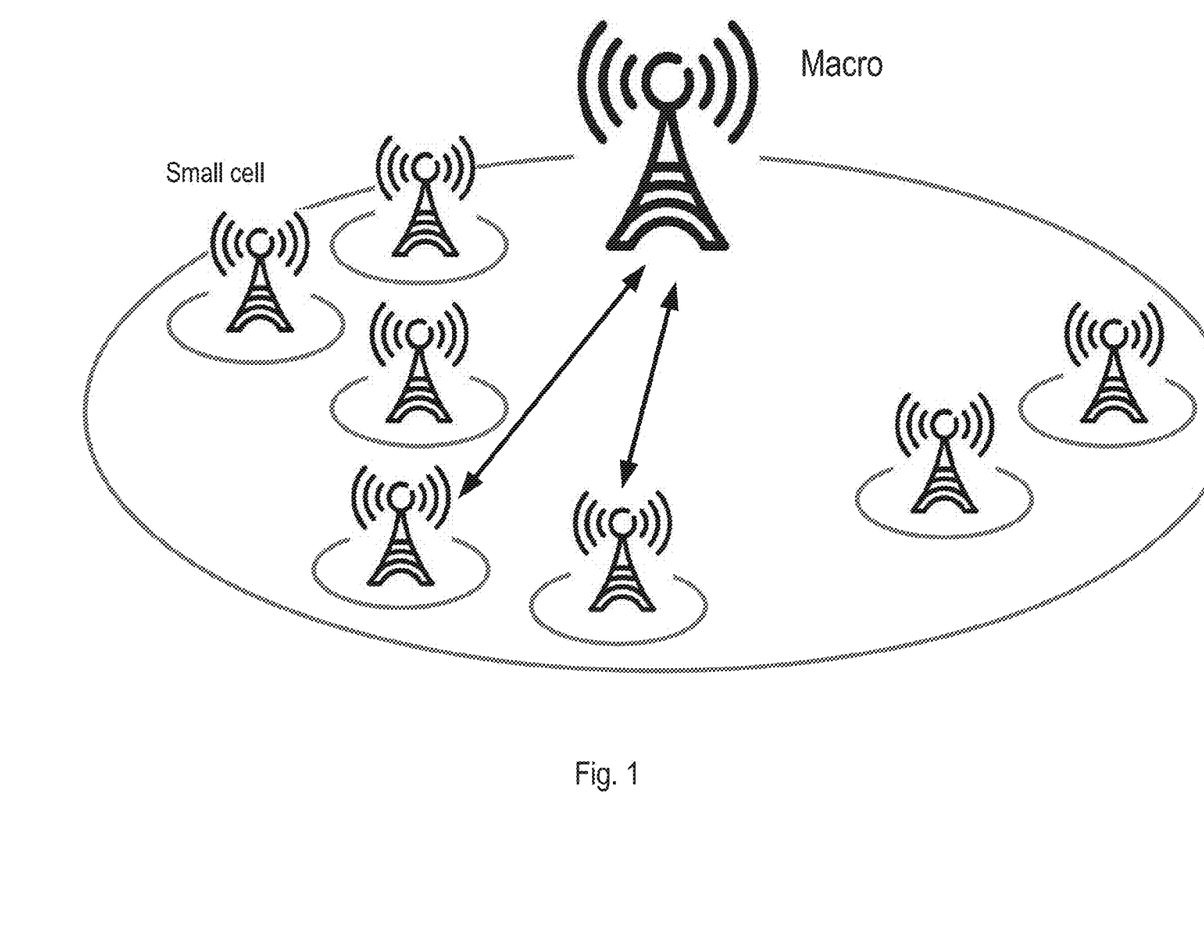
FIG. 1 is a diagram illustrating an example of a heterogeneous network comprising LPNs and a macro network node.

Another type of networks are known as heterogeneous networks: In Heterogeneous networks, in addition to the planned or regular placement of macro base stations mentioned above relating to homogeneous networks, several micro/pico/femto/relay/small cell base stations are deployed. This is depicted in FIG. 1.

The power transmitted by these micro/pico/femto/relay/small cell base stations is relatively small which may be up to 2 Watts, compared to that of macro base stations which may be up to 40 Watts. Due to the difference in transmit power, these micro/pico/femto/relay/small cell base stations may be viewed as Low Power Nodes (LPNs). An advantage of using LPNS is that when they are deployed in the network they are designed to or configured to eliminate coverage holes in the homogeneous networks (using macro only) as well as to improve the capacity in traffic hot-spots. Hence they complement the macro base stations to improve the capacity in the heterogeneous network. Also, due to their lower transmit power and smaller physical size, these LPNs offer flexible site acquisitions.

A LPN in a heterogeneous network may have a different cell identifier as that of macro base station which makes the cell formed by the LPN and the macro base station respectively different.

The LPN in such a network may also have the same cell identifier as that of a macro base station and in such case the cell formed by the LPN and the macro network node is soft cell or shared cell or combined cell.

In other words, in a combined cell of a heterogeneous network, a LPN may have a different cell ID and a different scrambling code as that of a macro network node. This is a first category of a heterogeneous network. Another category is that all LPNs share the same cell ID as that of the macro network node. These different categories are depicted in FIG. 2 and FIG. 3 respectively.

Figure 2:
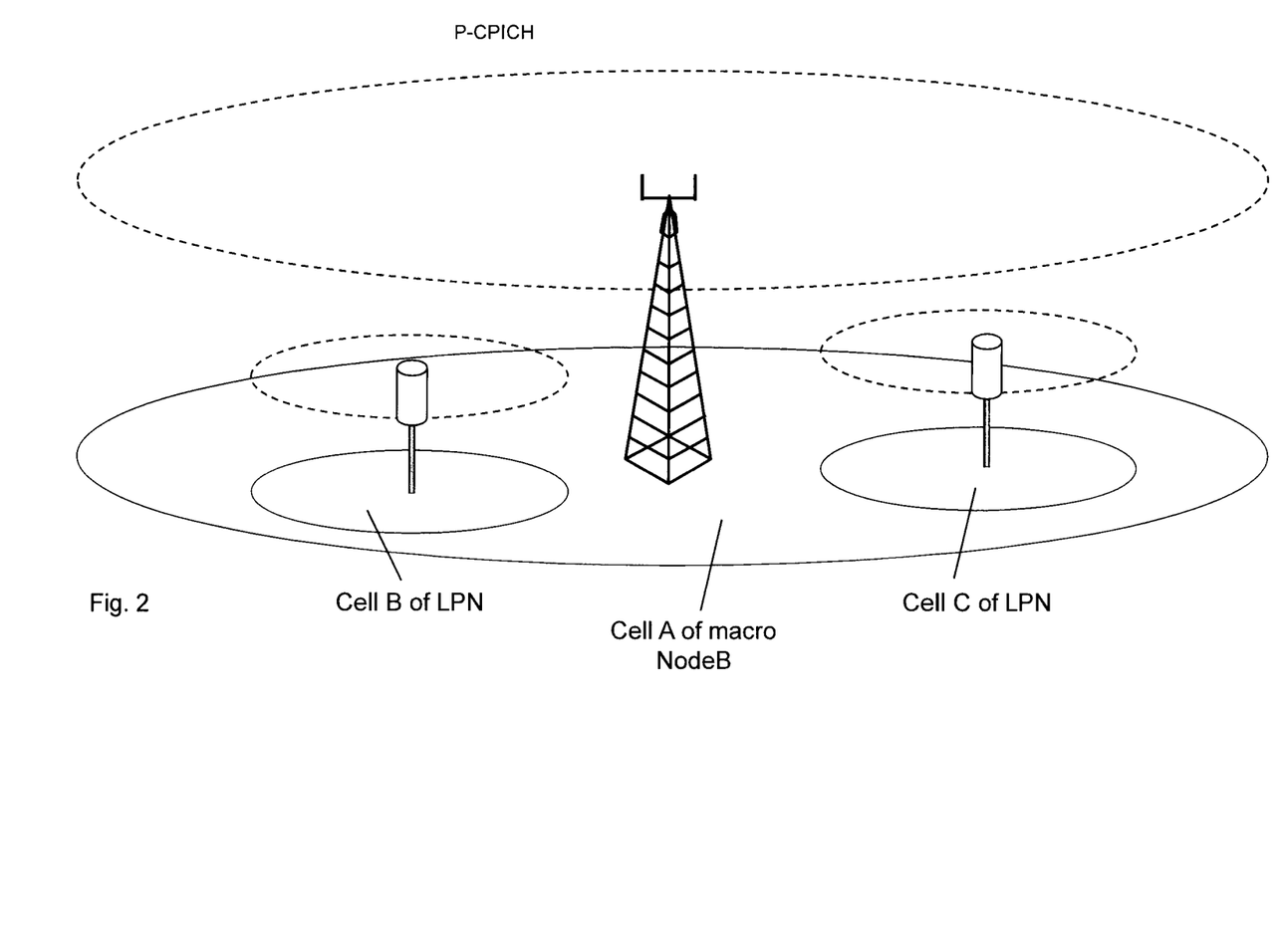
FIG. 2 is another diagram illustrating an example of a heterogeneous network wherein the LPNs have different cell IDs as that of a macro node.

As shown FIG. 2 shows a heterogeneous network where LPNs create different cells B and C, whereas the macro network node creates a cell A having a different ID than that of B and/or C. Simulations show that deploying LPNs in a macro cell offers load balancing, hence achieving huge gains in system throughout as well as cell edge user throughput.

A drawback with the scenario of FIG. 2 is that since each cell LPN creates a different cell, higher layer signaling is needed to perform handover of a UE when moving from one LPN to macro node or to another LPN.

Figure 3:
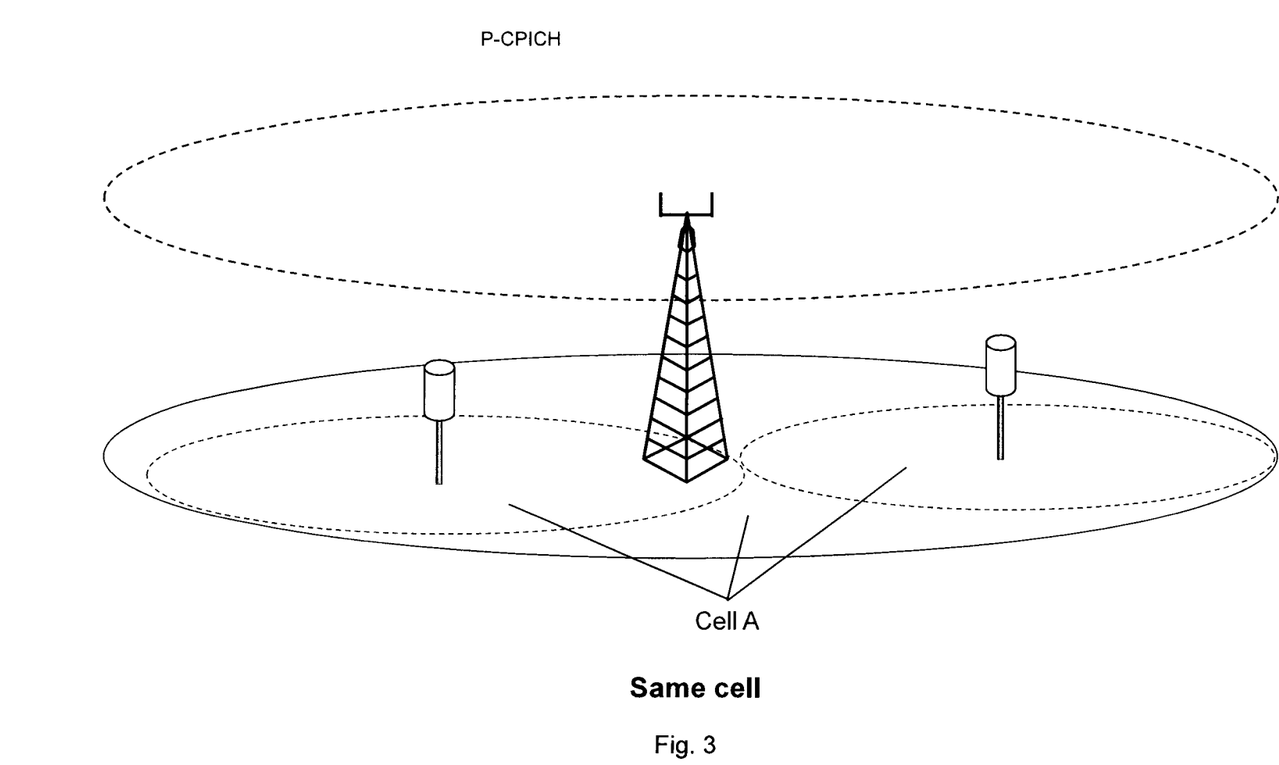
FIG. 3 is another diagram illustrating an example of a heterogeneous network wherein the LPNs and the macro node use the same cell ID.

In FIG. 3 the heterogeneous network comprises LPNs that are part of the macro cell A since the same cell ID is used for all cells. This deployment is sometimes referred to as a soft cell, shared cell, or combined-cell deployment. This deployment may be seen as a distributed Multi Input Multi Output (MIMO). This scenario may be used for different applications. For example two transmit antennas can be set up at Macro network node, while another two antennas may be installed at LPN. In this way a distributed MIMO system is created. Moreover this scenario avoids the frequent soft handovers, hence also avoids higher layer signaling.

Figure 4:
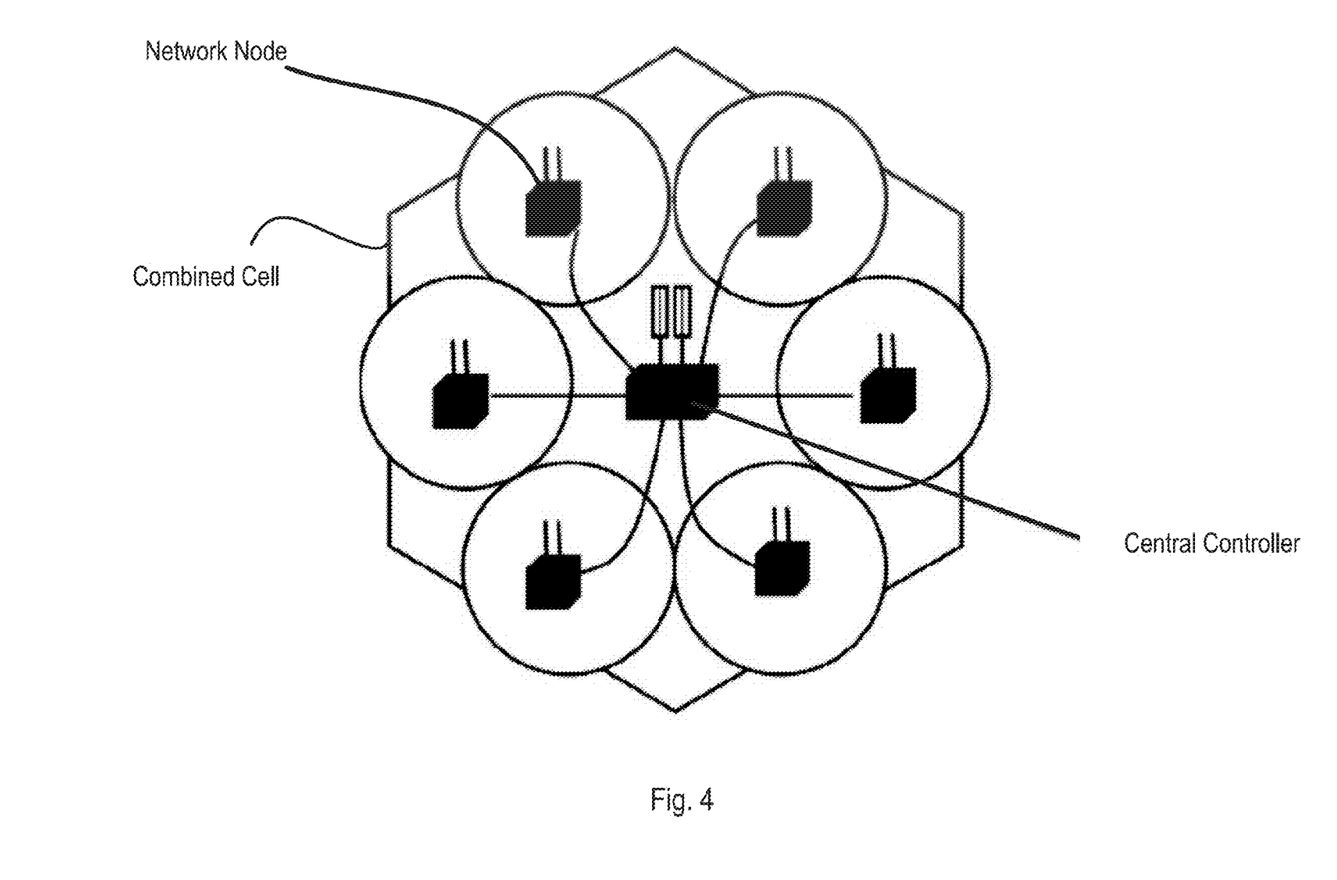
FIG. 4 is diagram illustrating an example of a combined cell deployment of a heterogeneous network comprising a central node/controller connected to other network nodes

Referring to FIG. 4 there is depicted a configuration or scenario of a combined cell deployment where a central controller in the combined cell is configured to collect operational statistics information of network environment measurements from the other network nodes (here shown surrounding the central controller). The central control may be a network node connected to a LPN or it may be a network node connected to a combination of LPNs and macro nodes. The central controller may also be a RNC or any suitable network node. The decision of which network node(s) to serve and transmit data and/or control signalling to a specific UE may therefore be made by the central controller based on the information provided by the UE or on its own. The cooperation among various network nodes is instructed by the central controller and implemented in a centralized way.

In a combined cell deployment, transmitting the same signal from each network node causes wastage of resources and fails to provide capacity benefits when the load of the cell is high. One approach to increase the capacity of the combined cell deployment is to reuse the resources e.g. spreading or channelization codes among various network nodes. This is sometimes called spatial reuse.

Figure 5:
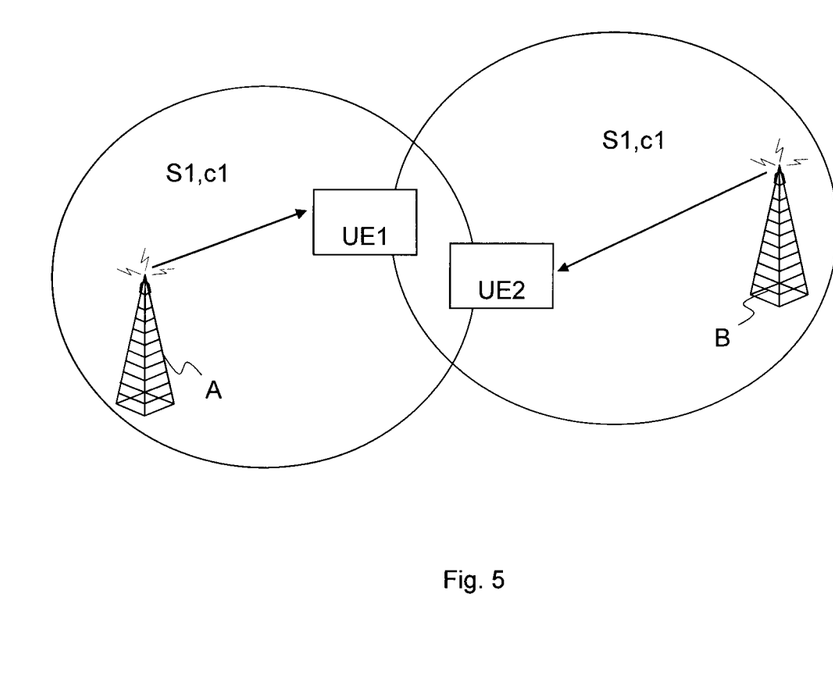
FIG. 5 shows the configuration of spatial reuse between two network nodes A and B in a combined cell.

FIG. 5 shows the configuration of spatial reuse between two network nodes A and B in a combined cell. These two network nodes share the same scrambling codes and also spreading or channelization codes. This is denoted in FIG. 5 as Si, Ci, where i=1.

For efficient implementation of spatial reuse, the central scheduler or central node needs to schedule the users (or UEs) to the proper (respective) network nodes. For example if a user is located nearer to a network node and the data is scheduled from another network node to this user, such a scheduling decision would result in waste of resources as well as unnecessary interference to the other cells.

One method to identify which network node(s) is appropriate for transmitting to a particular UE is by transmitting probing pilots. Unfortunately only UEs which can understand these pilots i.e. the UEs which are released after these pilots are standardized in third Generation Partnership Project (3GPP), Release 12; also called Rel-12 UEs; might be scheduled using probing pilots. The UEs which are already in the market; also called legacy UEs; may not benefit from these pilots. Hence when these UEs are present in the network or system, the central node is today unable to use spatial reuse scheme to improve the system capacity.

SUMMARY

An object of embodiments herein is to provide a method in a controller node and a controller node for selecting a network node for serving a legacy user equipment in a combined cell scenario of a heterogeneous network comprising a plurality of network nodes.

This, according to an aspect of embodiments herein, there is provided a method in a controller node for selecting for a user equipment at least one network node in a heterogeneous network comprising a plurality of network nodes, each network node transmitting a primary pilot channel and a secondary pilot channel, the method comprising: receiving from the UE, channel quality indicator (CQI) values, each CQI value corresponding to a channel estimate estimated by the UE on individual secondary pilot channel transmitted by a network node; processing the received CQIs; and deciding based on the processed CQIs which network node(s) in the heterogeneous network to select for serving the UE According to another aspect of embodiments herein, there is provided a controller node for selecting for a user equipment at least one network node in a heterogeneous network comprising a plurality of network nodes, each network node transmitting a primary pilot channel and a secondary pilot channel, the controller node comprising: a receiver unit configured to receive from the UE, channel quality indicator (CQI) values, each CQI value corresponding to a channel estimate estimated by the UE on individual secondary pilot channel transmitted by a network node; a processing unit configured to process the received CQI values, and the processing circuit further is configured to decide, based on the processed CQI values which network node(s) in the heterogeneous network to select for serving the UE.

The controller node taking the decision may, be seen a central node or a central processing unit and it may be a radio base station (or NodeB) being a macro base station or it may be a LPN or it may be a RNC or any suitable network configured to perform the functions above. The controller node may further be seen as a network node.

An advantage with the present embodiments is to provide spatial reuse gain for UEs (legacy UEs and/or Rel 12 and further UEs) thereby capacity can be improved in the combined cell of a heterogeneous network.

Another advantage is to save energy and/or power in the network since at least one node is selected for serving or transmitting data to the UE instead of having all nodes serving the UE.

Yet another advantage is to distinguish which network node(s) to select among network nodes based on pilot signals transmitted from the network nodes in the network.

DETAILED DESCRIPTION

Embodiments herein relate to heterogeneous networks in general and in particular to combined cell deployment of a heterogeneous network. The combined cell comprises a plurality of radio network nodes which may be a mix of network nodes which may be Low power Nodes (LPNs) and macro base stations. At least one of these network nodes may act as a central controller node or a central processing unit or a central scheduler unit. It should be mentioned that the network comprises one or more Radio Access Networks (RANs) and one or more Core Networks (CNs). The network may use access technologies such as Long Term Evolution (LTE), LTE-Advanced, Wideband Code Division Multiple Access (VVCDMA), High Speed Packet Access (HSPA) Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the network one or more UEs are located and theses UEs may be legacy UEs or Rel. 12 UEs, as explained earlier. As previously mentioned, the UEs may be connected to one or more network nodes wirelessly. One method to identify which network node(s) is appropriate for transmitting to a particular UE is by transmitting probing pilots. For example probing pilots may either be continuously transmitted or transmitted periodically. Unfortunately, as explained before only UEs which can understand these pilots i.e. the UEs which are released after these pilots are standardized in third Generation Partnership Project (3GPP), Release 12; also called Rel-12 UEs; might be scheduled using probing pilots. The UEs which are already in the market; also called legacy UEs, may not benefit from these pilots. Hence when these UEs are present in the network or system, the central controlled node is not able to use spatial reuse scheme to improve the system capacity.

Therefore, it is desirable to provide a method that allows any type of UE to be served by a network node upon selection by the controller node of that network node.

Figure 6:
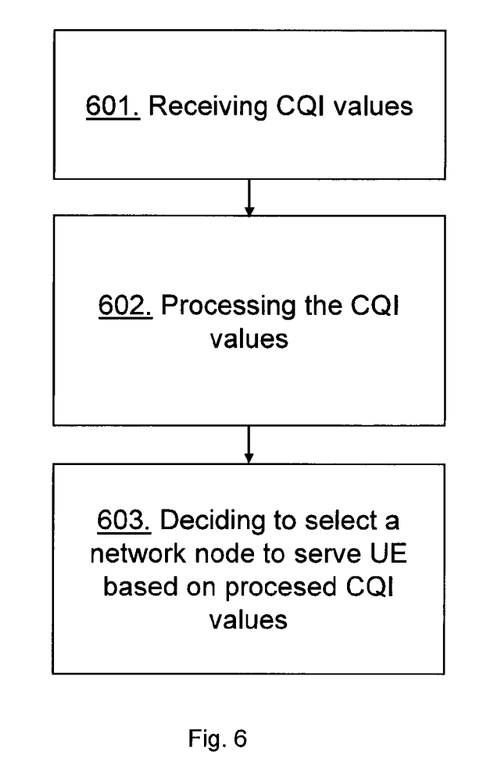
FIG. 6 illustrates a method for selecting a network node in accordance with some exemplary embodiments herein.

Before describing exemplary embodiments of the present technology the main steps of the method performed by a network or controller node acting as a central network node for selecting at least network node for serving and a UE in a combined cell of a heterogeneous network are first presented in conjunction with FIG. 6.

As shown the main steps comprise:

(601) receiving from the UE channel quality indicator (CQI) values corresponding to channel estimates performed by the UE on individual pilots transmitted by network nodes in the combined cell;

(602) processing, by said controller node, the received CQIs or CQI values; and (603) deciding based on the received and processed CQIs which network node(s) to select or schedule for serving the UE.

The individual pilot or pilot channel transmitted from a network node and used for estimating the CQI value is a secondary pilot channel. The individual secondary pilot channel transmitted is periodically transmitted by the network node. As explained below, each network node may transmit both a primary pilot channel and a secondary pilot channel Referring to FIG. 7, there is shown a message sequence chart including channels such as a Primary Common Pilot Channel (P-CPICH); a High Speed Dedicated Physical Control Channel (HS-DPCCH); a High Speed-Shared Control Channel (HS-SCCH) and a downlink traffic channel High Speed-Physical Dedicated Control Channel (HS-PDSCH).

Figure 7:
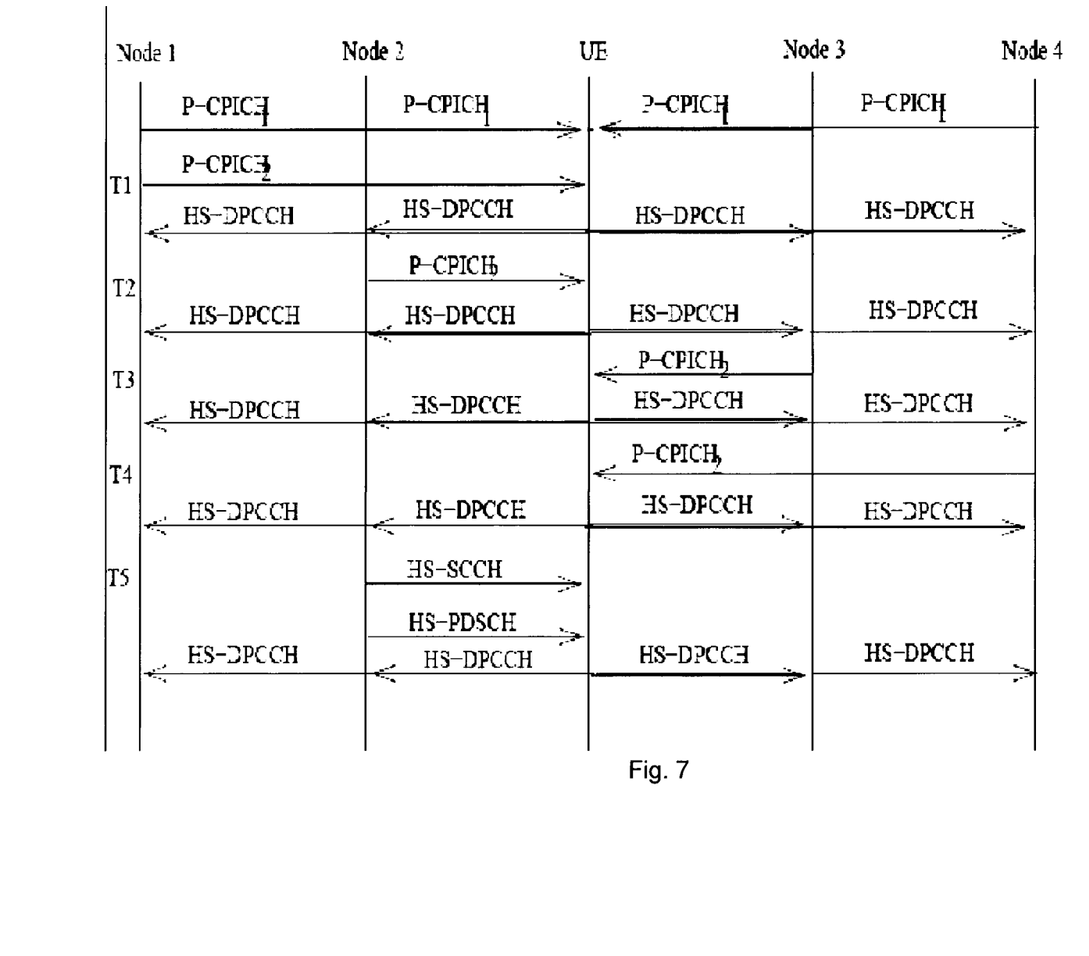
FIG. 7 illustrates messages exchanged between network nodes and a UE according to an exemplary embodiment.

In FIG. 7, four nodes (Node 1-4) are shown and a single UE is depicted. The embodiments herein are not restricted to any particular number of UEs or network nodes. Here is it assumed that the four nodes are included in a combined cell deployment. Each node is capable of serving one or more UEs. It is here also assumed that the UE under consideration is configured with a plurality of carries i.e. at least dual carries. During the cell setup, the UE may obtain radio configuration parameters from a RNC or any of the four nodes. This call set up is not shown in FIG. 7.

Each network node is configured to transmit the P-CPICH. This primary carrier/pilot channel P-CPICH is transmitted continuously. In contrary, a secondary carrier/pilot channel denoted P-CPICH2 is transmitted from each network node periodically for a certain duration. Herein, and in accordance with an exemplary embodiment, the second carrier is used as a probing carrier or probing pilot. For example at one time instance denoted T1 in FIG. 7, the pilot channel belonging to this carrier P-CPICH2 is transmitted from Node 1; and at T2, the pilot belonging to P-CPICH2 is transmitted from Node 2; and at T3, the pilot belonging to P-CPICH2 is transmitted from Node 4; and at T4, the pilot belonging to P-CPICH2 is transmitted from Node 4. These pilots are transmitted to the UE. When the UE receives these pilot carriers, the UE estimates the channel quality in terms of CQI value(s) corresponding these carries based on individual pilots. The UE is then configured to report the estimated CQIs in an uplink feedback channel HS-DPCCH which channel is received by all four nodes as shown in FIG. 7.

As mentioned earlier anyone of the nodes may act as a central controller node or as a central processing unit. Assume for example that Node 1 is acting as a central processing unit. Node 1 then processes each received signal HS-DPCCH from all nodes. This node may e.g. combine the received HS-DPCCH using maximum ratio combining or selection combining. Node 1 may process the received signals over a period of time say T_proc and then keeps note or stores of the CQI values of the above mentioned second carriers P-CPICH$_2$. Based on the channel qualities stored or CQIs, the central controller Node 1 decides which node(s) is/are suitable for serving and transmitting data and control information to the UE. The same applies in case another network node Node 2, Node 3 or Node 4 is acting as a central controller node. In FIG. 7, it is Node 2 that is selected to serve the UE. This is indicated in time instance T5 by the transmission of HS-SCCH from Node 2 to the UE.

Above was explained an embodiment wherein in a single network node is selected to serve the UE.

Figure 8:
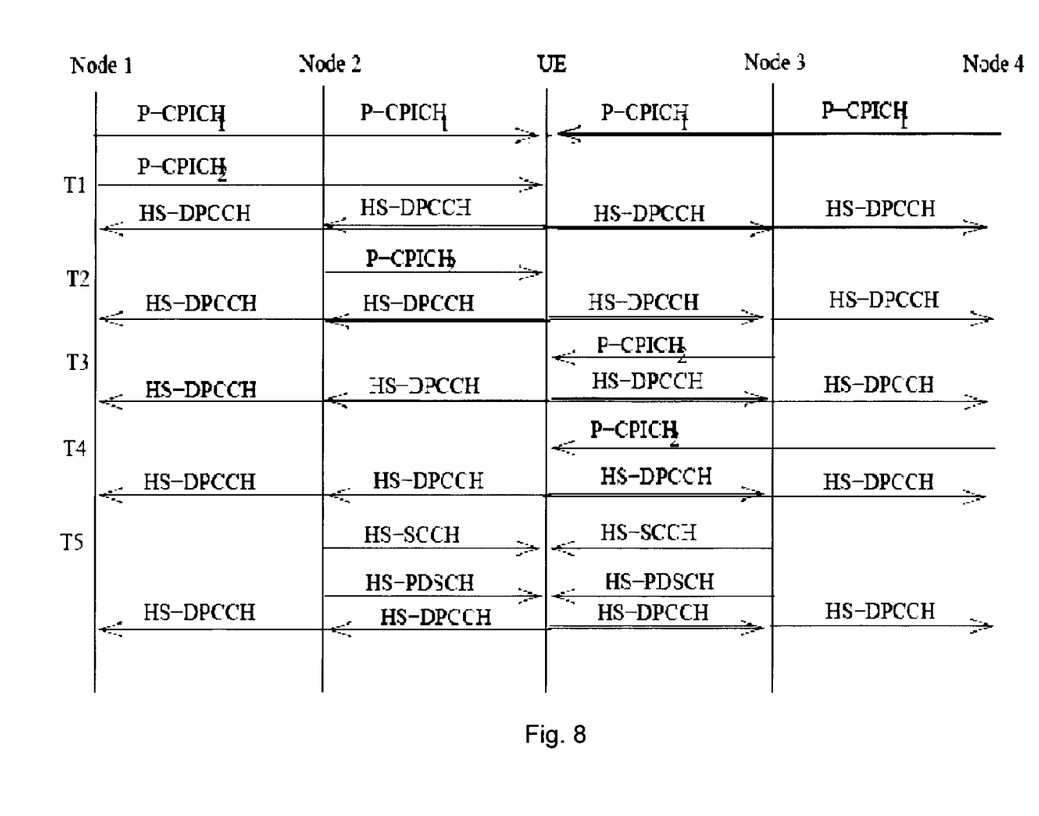
FIG. 8 illustrates messages exchanged between network nodes and a UE according to another exemplary embodiment.

FIG. 8 shows a message sequence chart where two nodes are selected in accordance to another embodiment herein. In that case, Node 2 and Node 3 are selected to serve the UE at time T5. This is indicated by the transmission of HS-SCCH from Nodes 2 and 3 respectively to the UE. Similarly to FIG. 7, the same channels and carries and pilots are shown. The process is repeated after some time interval. Here the central node may de-activate the secondary carrier once it decides on which network nodes to serve the UE. The secondary carrier may be re-activated after some time when it decides to probe the UE.

It should be mentioned that by using the secondary carrier/pilot to determine the CQI, the central controller may distinguish which network node transmitting the secondary pilot/carrier is most suitable for serving the UE. However, if the primary carrier is used to determine the CQI, the central node may not distinguish between the network nodes. This is because the primary carrier P-CPICH is continuously transmitted while the secondary carrier P-CPICH$_2$ is transmitted periodically for certain duration from each node. Hence the CQI of the secondary carrier of each network node is, in accordance with embodiments herein, used to select and decide on which network node to serve the UE.

Figure 9:
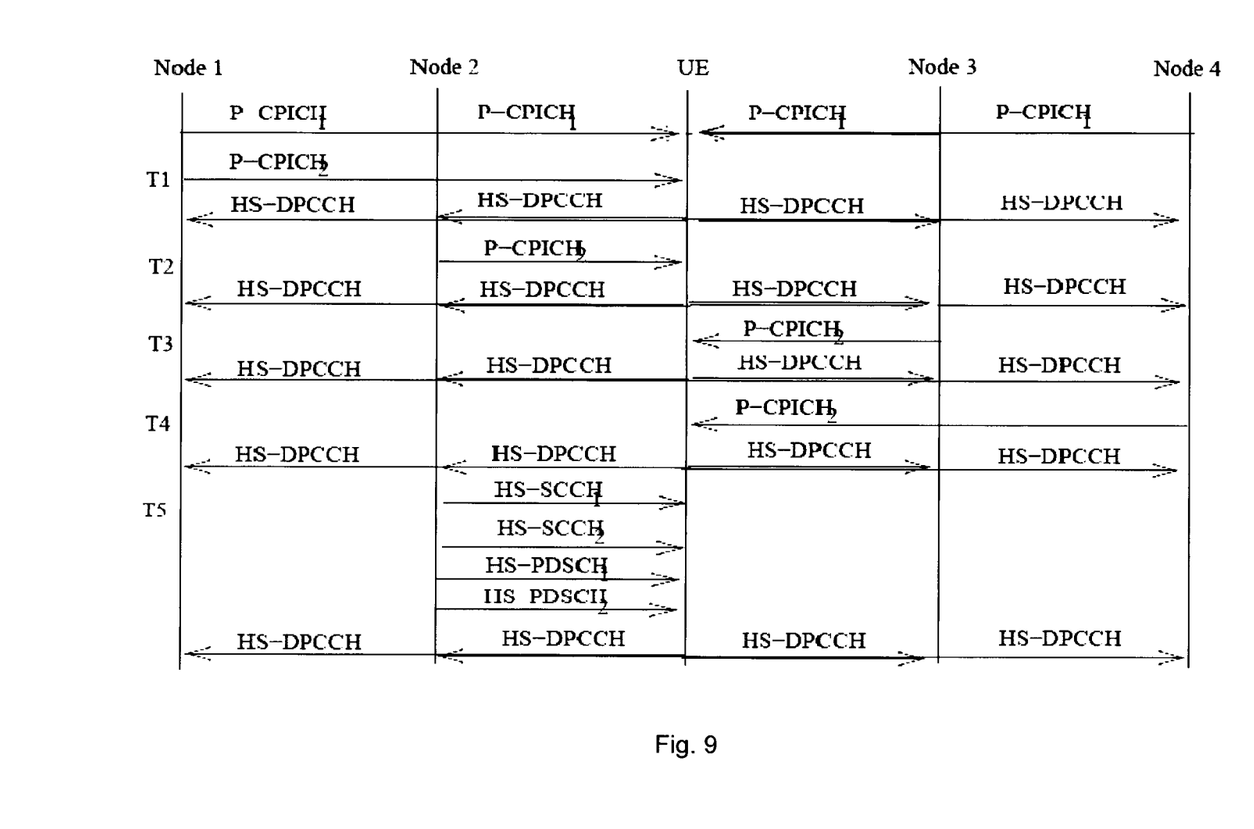
FIG. 9 illustrates messages exchanged between network nodes and a UE according to another exemplary embodiment.

FIG. 9 illustrates an example of a message sequence chart when the central controller decides to select two carriers for data transmission or for serving the UE. Similarly to the previously described embodiments, the central controller node may be any of the network nodes in the combined cell scenario. The same process as shown and discussed with respect to FIGS. 7 and 8 are applicable for this exemplary embodiment up to time instance T5. Once the central node decides which node to serve the UE, it can de-activate the secondary carrier/probing and subsequently inform e.g. the RNC to send a RNC configuration message to configure a secondary carrier having a different frequency than that of the probing secondary carrier. As shown, in T5, Node 2 has been selected to serve the UE as Node 2 sends two carriers denoted here HS-SCCH$_1$ and HS-SCCH$_2$ to the UE.

It should be noted that instead of de-activating the carrier used for probing, the central node may decide to schedule the UE on the secondary carrier in addition to the primary carrier P-CPICH. This means that in this example, the secondary carrier is used for probing as well as that of secondary carrier.

In the following it is described on what basis the central controller node make a decision on which network node(s) to serve the UE. As previously described the central controller node processing unit or processing circuitry is configured to process received CQIs; and is further configured to decide based on the received and processed CQIs which network node(s) to select or schedule for serving the UE. The central node stores the CQI values and takes the decision based on e.g. a CQI threshold. For example, the central node selects the CQI having a value that is greater than the CQI threshold. Another example is to use the highest CQI of the secondary carrier and compare it with the threshold and if it is greater than the threshold, the network node associated with the highest CQI is selected to serve the UE. Another example is to base the decision on the CQI of the primary carrier.

The CQI threshold may be determined by the central controller node as follows:

Step 1: Pre-compute a signal to noise ratio (also known as geometry) from a CQI of each network node. This can be done by simulations.

Step 2: Compute the geometry of the UE with respect to each network node.

Step 4: Determine the geometry difference between the network node corresponding to the highest geometry and the remaining geometries of the other network nodes.

Step 4: Select the network nodes whose difference is e.g. 5 dB or more compared to the node with the highest geometry.

Step 5: Compute the CQI threshold based on the selection.

Figure 10:
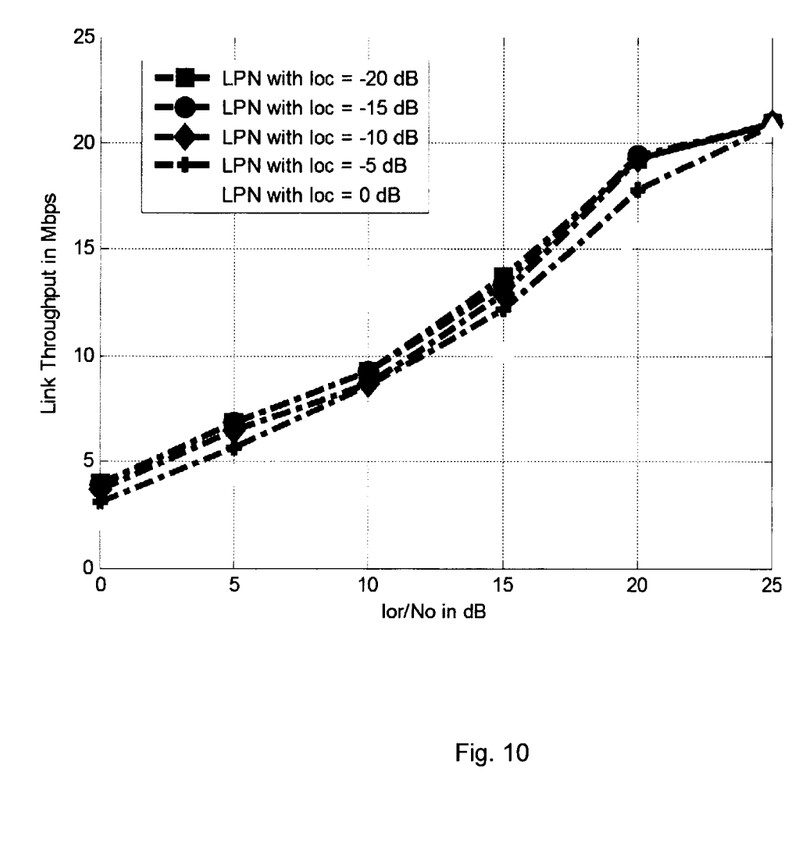
FIG. 10 illustrates results from link throughput simulations for combined cell deployment.

FIG. 10 illustrates the performance when the UE performance is impacted by interference from a second network node. The graph shows the Link Throughput in Mbps as a function of the geometry denoted Ior/No. It can be seen that when the geometry of a second network node; being here a LPN; is 5 dB below the performance of a first node, the UE performance in terms of throughput is not impacted too much.

Figure 11:
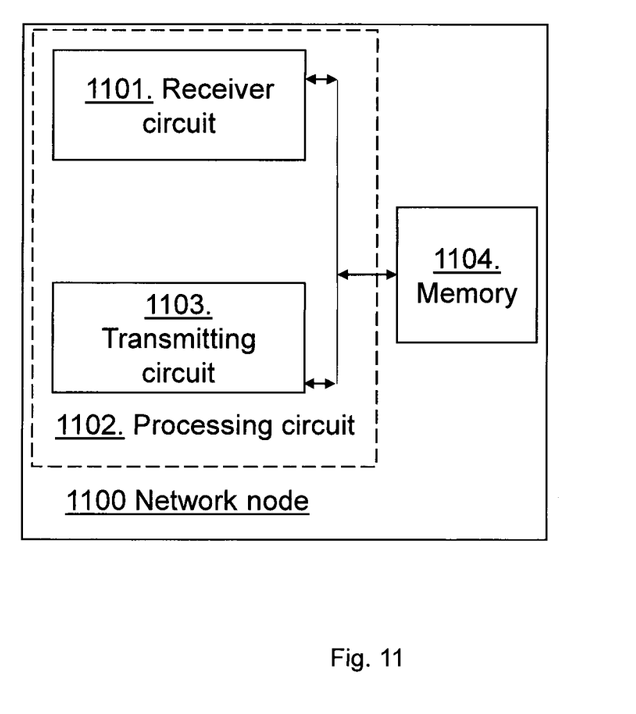
FIG. 11 illustrates a block diagram depicting a network/controller node according to exemplary embodiments herein.

Referring to FIG. 11 there is illustrated a network controller node 1100 for selecting at least one network node in a combined cell deployment of a heterogeneous network in accordance with embodiments herein. The controller network node 1100 comprises a receiver circuit or receiver unit 1101 configured to receive from the UE CQI values corresponding to channel estimates performed by the UE on individual pilots or carriers or pilot channels transmitted by the network nodes of the combined cell. The pilots or carriers being secondary carriers as previously described. The network node 1100 further comprising a processing circuit or processing unit 1102 configured to process the received CQIs. The processing circuit 1102 is further configured to decide based on the processed CQIs which network node(s) to select or schedule for serving the UE. The UE may be a legacy UE or a Rel. 12 UE. Hence the embodiments described herein are applicable independently on what type of UE is to be served in the combined cell. The network controller node 1100 may further comprise a transmitting circuit 1103 configured to transmit data or control signaling to the UE.

The controller node 1100 may further comprise a memory 1104 for storing CQI values or any additional information e.g. the geometry of each network node or channel state information (CSI), muting patterns, UE speed etc. The network node may contain additional units circuits not illustrated such as one or several antennas, interfaces towards other network nodes etc.

It should be mentioned that the embodiments herein for selecting a suitable network node may be implemented through one or more processors or processing units e.g. processing circuit or unit 1102 of the network node 1100 together with a computer program code for performing the functions and/or method steps of the embodiments. The program code mentioned above may also be provided as a computer program product, for instance in the form of a data carrier carrying computer program code for performing embodiments herein when being loaded into the network node. One such carrier may be in the form of a CD ROM disc. It is however feasible with other data carriers such as a memory stick. The computer program code may furthermore be provided as pure program code on a server and downloaded to the network controller node 1100.

Additional details on the method steps and functions performed by the network node acting as a central controller node have already been described in greater detail and therefore a repetition of the previous text is not considered necessary.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP LTE of HSPA has been used in this disclosure to exemplify the invention, this should not be seen as limiting the scope of the invention to only the aforementioned system. Other wireless systems, including LTE-A (or LTE-Advanced), UMTS, WMax, and wireless LAN, may also benefit from exploiting the ideas covered within this disclosure.

REFERENCES

[1] RP-121436, Study on UMTS Heterogeneous Networks
[2]. R1-124512, Initial considerations on Heterogeneous Networks for UMTS, Ericsson, ST-Ericsson
[3]. R1-124513, Heterogeneous Network Deployment Scenarios, Ericsson, ST-Ericsson.

The invention claimed is:

1. A method in a controller node for selecting for a user equipment, UE, at least one network node in a heterogeneous network comprising a plurality of network nodes, each network node transmitting a primary pilot channel and a secondary pilot channel, the method comprising:
   receiving from the UE, channel quality indicator (CQI) values, each CQI value corresponding to a channel estimate estimated by the UE on the secondary pilot channel transmitted by a network node;
   processing the received CQI values, including storing the received CQI values; and
   deciding based on the stored CQI values which network node(s) in the heterogeneous network to select for serving the UE, wherein the deciding comprises comparing the received and stored CQI values with a CQI threshold and selecting the network node(s) associated with the CQI value having a value higher than the CQI threshold.

2. The method according to claim 1 wherein receiving comprises receiving each CQI value in a feedback channel being a high speed-dedicated physical control channel.

3. The method according to claim 2 further comprises combining the received feedback channels using maximum ratio combining or selection combining.

4. The method according to claim 1 wherein each individual secondary pilot channel transmitted by the network node is periodically transmitted by the network node.

5. A controller node for selecting for a user equipment, UE, at least one network node in a heterogeneous network comprising a plurality of network nodes, each network node transmitting a primary pilot channel and a secondary pilot channel, the controller node comprising:
   a receiver circuit configured to receive from the UE, channel quality indicator (CQI) values, each CQI value corresponding to a channel estimate estimated by the UE on the secondary pilot channel transmitted by a network node; and
   a processing circuit configured to process the received CQI values including storing the received CQI values, and the processing circuit further is configured to decide, based on the stored CQI values which network node(s) in the heterogeneous network to select for serving the UE, wherein the processing circuit is configured to decide by comparing the received and stored CQI values with a CQI threshold and to select the network node(s) associated with the CQI value having a value higher than the CQI threshold.

6. The controller node according to claim 5 wherein the receiver circuit is configured to receive each CQI value in a feedback channel being a high speed-dedicated physical control channel.

7. The controller node according to claim 6 wherein the controller node is further configured to combine the received feedback channels using maximum ratio combining or selection combining.

8. The controller node according to claim 5 wherein each individual secondary pilot channel transmitted by the network node is periodically transmitted by the network node.

* * * * *